United States Patent [19]

Erker et al.

[11] 4,173,264
[45] Nov. 6, 1979

[54] EXPANDABLE VEHICLE FRAME

[75] Inventors: James W. Erker, Mentor-on-the-Lake; Richard A. Schwehr, Mentor, both of Ohio

[73] Assignee: Towmotor Corporation, Mentor, Ohio

[21] Appl. No.: 909,414

[22] Filed: May 25, 1978

[51] Int. Cl.² .......................................... B62D 25/08
[52] U.S. Cl. ................................. 180/68.5; 280/759; 280/800
[58] Field of Search ..................... 296/28 R; 180/68.5; 280/638, 140, 142, 786, 800, 758, 759

[56] References Cited

U.S. PATENT DOCUMENTS

| 2,859,890 | 11/1958 | Renard | 214/670 |
|---|---|---|---|
| 2,916,172 | 12/1959 | Locke | 280/759 |
| 3,061,034 | 10/1962 | Hoyt | 280/68.5 |
| 3,100,653 | 8/1963 | Ibaugh | 280/800 |
| 3,181,881 | 5/1965 | Van Raden | 280/142 |
| 3,517,941 | 6/1970 | Lazzeroni | 280/758 |

Primary Examiner—Joseph F. Peters, Jr.
Assistant Examiner—John A. Carroll
Attorney, Agent, or Firm—Phillips, Moore, Weissenberger, Lempio & Majestic

[57] ABSTRACT

A vehicle frame has first and second members having adjustably telescoping channel portions securable by bolts disposed in selected combinations of holes provided in the channel portions for providing a total vehicle frame of a chosen length and wheelbase. Adjacent portions of the respective members define portions of a battery compartment which varies with the size of the vehicle frame to accommodate the power requirements thereof. Channel shaped spacers join facing portions of the members for increased strength of the resulting frame.

A rear axle mounting assembly is adjustably mounted on the rear member for independent adjustment of the wheelbase.

A second embodiment has front and rear members secured by a selected nestable spacer member having an adjustable axle mounting for independent adjustment of the vehicle frame and wheelbase.

21 Claims, 6 Drawing Figures

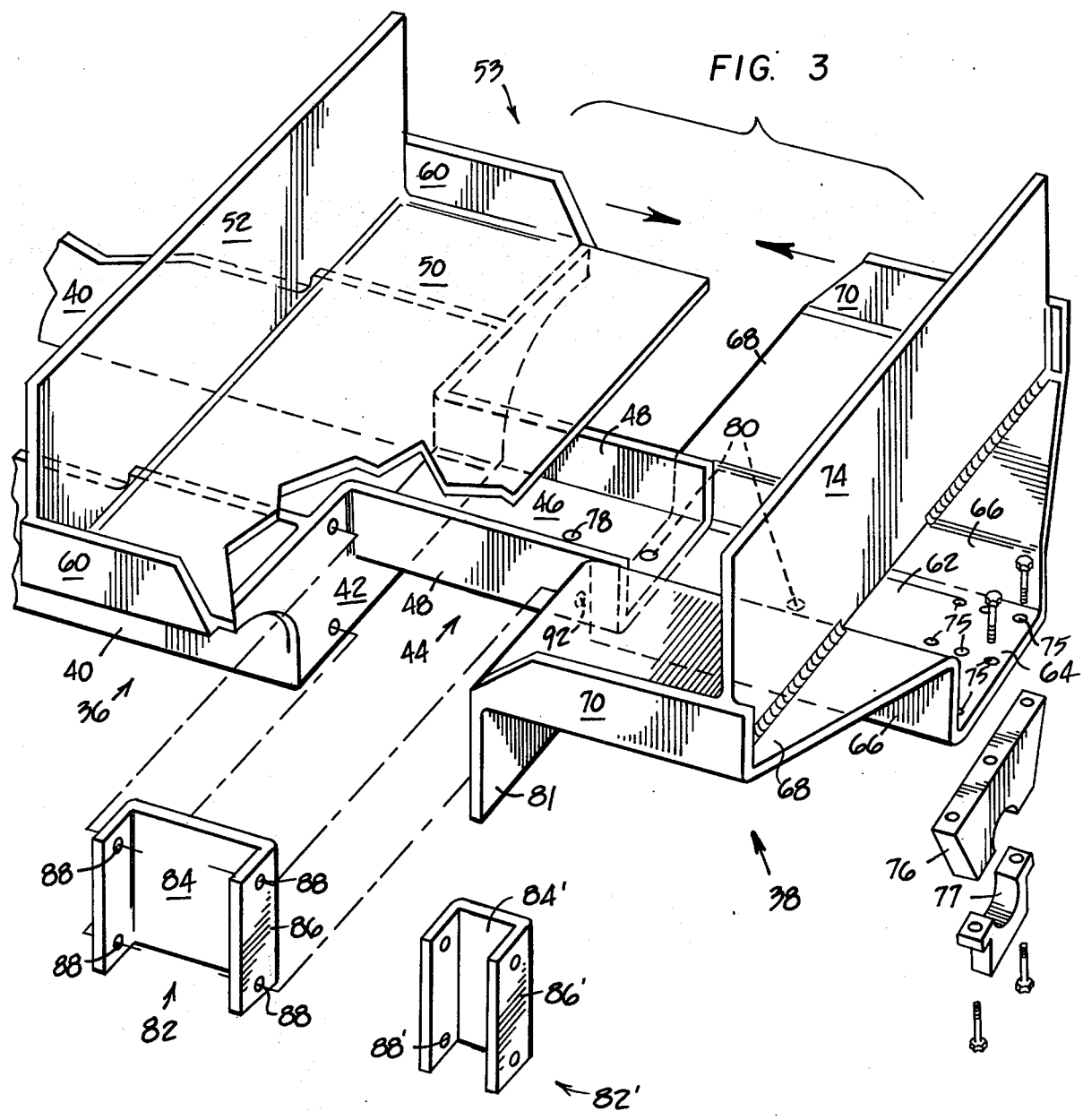

EXPANDABLE VEHICLE FRAME

BACKGROUND OF THE INVENTION

This invention relates to the field of vehicle frames and more specifically to frames for vehicles of various lengths. Many vehicles are produced in a progressive series of sizes, requiring frames of various lengths. This requires the production and inventorying of frames of various sizes. Also some vehicles used to support heavy loads at one end, such as fork lift trucks, and vehicles which pull heavy loads, such as tractors, require counterbalancing by supporting a counterweight on the other end of the vehicle a selected distance from the axles. Such vehicles thus require auxiliary frame means for extending one end of the vehicle for extended support of the counterweight to achieve a required moment arm for counterbalancing of the vehicle.

SUMMARY OF THE INVENTION

The present invention provides a vehicle frame that is longitudinally adjustable to provide a selectably larger frame. Accordingly vehicles of various sizes can be constructed from the frame elements of the present invention. Furthermore, a counterweight supported on one end of the frame can be positioned a desired length from the front axle for counterbalancing anticipated loads. Additionally, the expandable portion of the frame includes a battery compartment that expands with the vehicle frame to provide increased capacity for powering vehicles of comparably increased size. Adjustable axle mounting means is provided for varying the wheelbase independent of the vehicle length.

The foregoing is achieved by providing a vehicle frame that includes front and rear members which have portions that slide together so that the respective elements may be longitudinally adjusted relative to each other to form a frame of the desired length. A series of bolt holes are provided in the respective frame elements for securing them together by means of bolts. An axle mounting assembly is adjustably mounted on one of the members for independent adjustment of the vehicle wheelbase.

DESCRIPTION OF THE DRAWINGS

In the drawings:

FIG. 3 is another perspective view of a portion of the frame of the present invention;

FIG. 4 is a perspective view of an alternative spacer of the present invention;

DESCRIPTION OF THE PREFERRED EMBODIMENT

Figure 1:
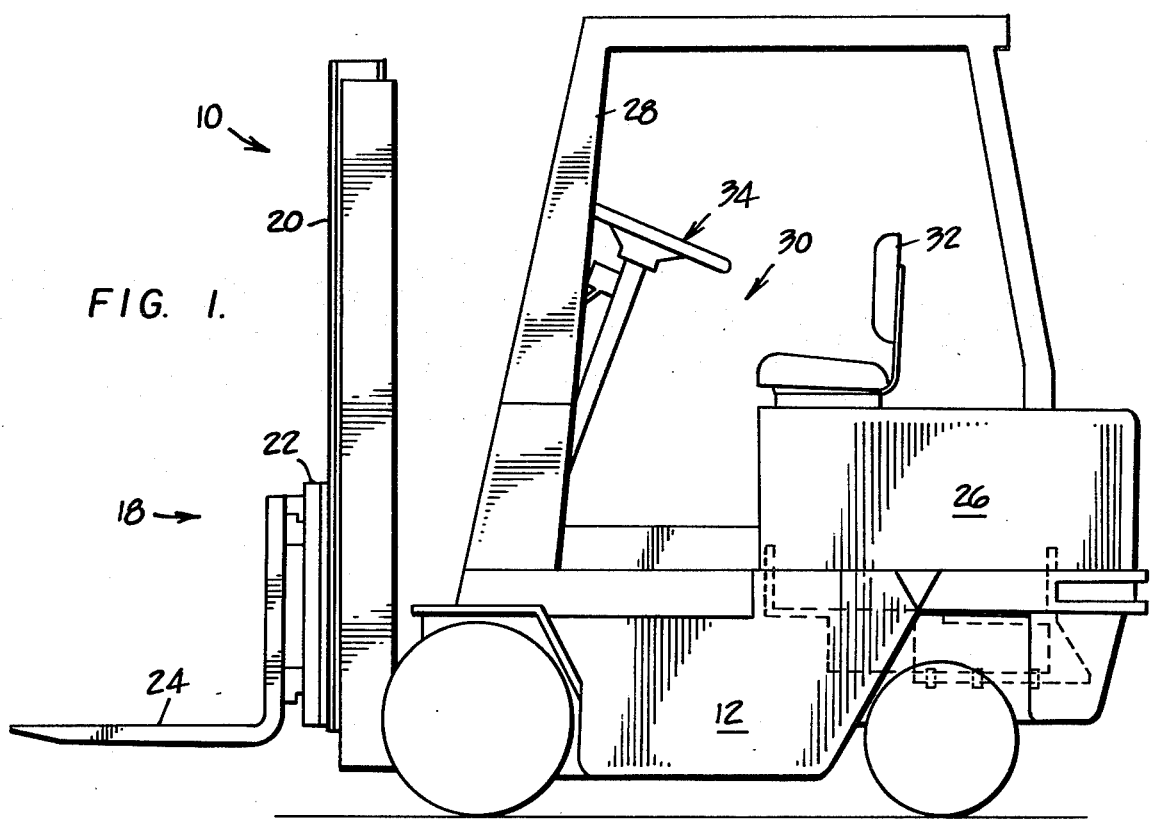
FIG. 1 is an elevational view of a lift truck embodying the present invention.

Referring to FIG. 1, a lift truck embodying the present invention is shown generally at 10 comprising a frame 12 mounted on front and rear axle assemblies 14 and 16 and having a lift mast assembly 18 mounted on the front thereof. The mast assembly may be of conventional design, and includes telescoping uprights 20 having a carrier 22 slidably mounted therebetween, and forks 24 mounted thereon.

Mounted on top of frame 12 is a battery cover 26 and an overhead guard structure 28 which encompasses an operator's station shown generally at 30, which includes a seat 32 mounted on the top of the battery cover, and controls 34 for operating the lift truck.

Figure 2:
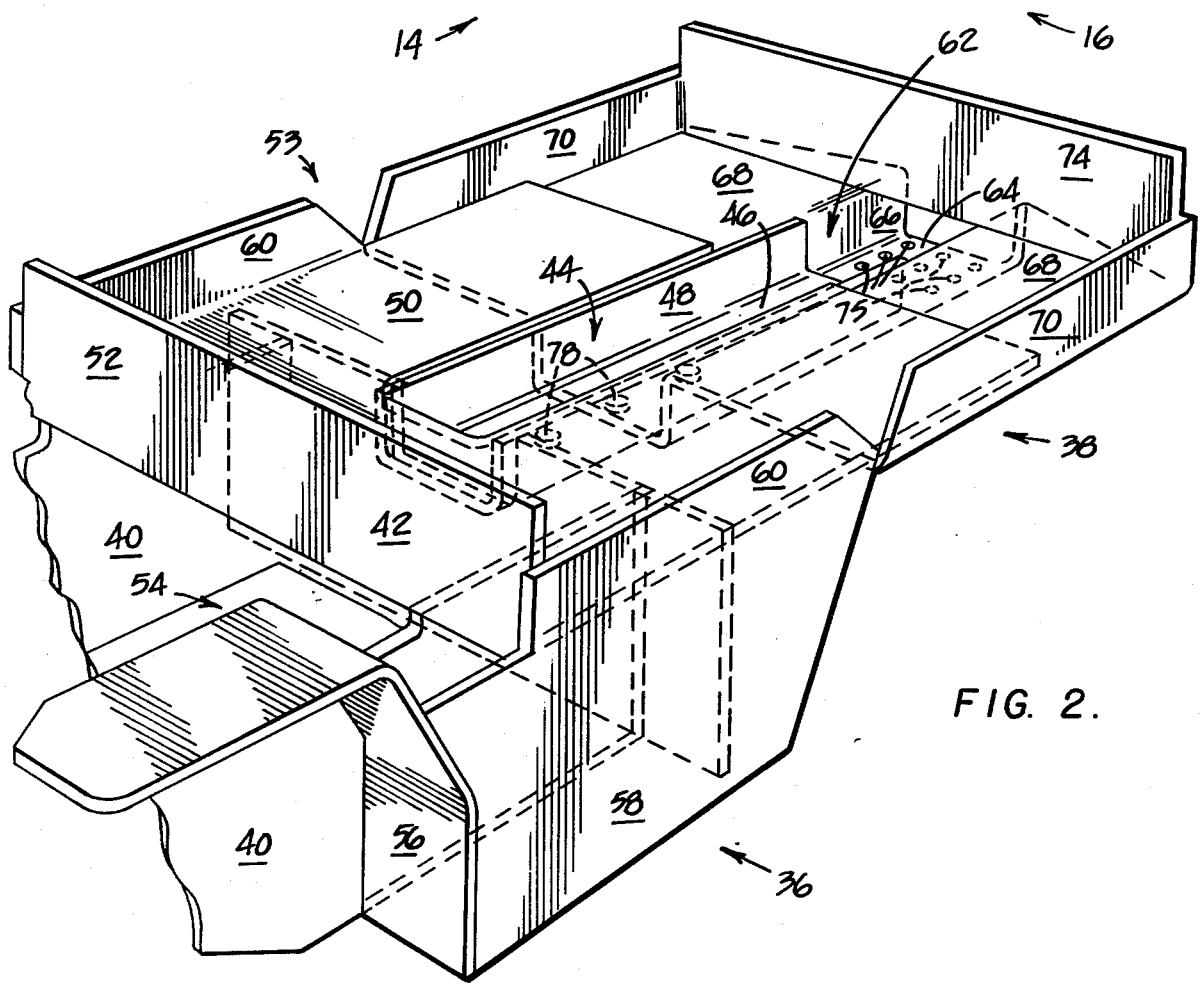
FIG. 2 is a perspective view of a portion of the frame of the lift truck shown in FIG. 1.

Referring to FIGS. 2 and 3, frame 12 comprises a front member 36 and a rear member 38.

Front member 36 comprises spaced parallel vertical rails 40 having their rearward ends joined by a front cross plate 42, and their forward ends provided with means, not shown, for mounting front axle assembly 14. Such mounting means may comprise any of a number of arrangements including conventional mounting means known to those skilled in the art. Extending rearwardly from and fixed to the central portion of front cross plate 42 is a channel structure 44 comprising a bottom plate 46 and side plates 48. A horizontal floor plate 50 is disposed on top of rails 40, front cross plate 42 and a portion of channel structure 44, which projects rearwardly beyond the rearward extension of floor plate 50.

The floor plate 50 may be provided with an opening above channel structure 44 as shown in FIG. 2; or completely cover the channel structure, as shown in FIG. 3.

The floor plate extends forwardly to an upstanding front wall 52, secured to the front edge thereof, which defines the forward limit of a battery compartment 53.

Mounted on the outer sides of rails 40 rearward of the front axle assembly are fender assemblies 54 comprising front wheel fenders 56 and side fenders 58 which extend rearwardly from fenders 56 and along the sides of front wall 52 and a portion of floor plate 50. Side fenders 58 project upwardly above floor plate 50 to provide front rub rails 60 which define the width of battery compartment 53.

Rear frame member 38 comprises a channel portion 62 having a bottom 64 and sides 66, and which is congruent with front channel structure 44 and is adapted to be disposed beneath and around channel structure 44 in telescoping relationship therewith, with portions of the channel structure 44 and member 38 in lapping relation. Extending laterally outwardly from the top edges of sides 66 level with the top edges of upstanding sides 48 of channel structure 44 are floor members 68 which extend outwardly commensurate with and immediately under, floor plate 50, and terminate in upstanding rear rub rails 70 which are aligned with front rub rails 60.

An upstanding rear end plate 74 is secured to floor members 68 and side walls 70 toward the rearward limit thereof to define the rear end of battery compartment 53. Channel 62 extends rearwardly beyond end wall 74, and terminates with a series of bolt holes 75 for selectively mounting an axle mounting assembly 76 and means 77 for mounting on rear axle assembly 16 thereon. A counterweight may be mounted on rear frame section 38 behind end plate 74.

Thus, rear frame section 38 is telescopically slidable with respect to front frame section 36 to selectively vary the length of the vehicle frame, the wheelbase of the vehicle, and counterbalancing of the vehicle. Channel 62 may be secured to channel structure 44 at the lapping portions thereof by means of bolts disposed in a selected combination of bores 78 and 80 provided in channel structure 44 and channel 62 respectively.

To add strength and rigidity to the assembled frame, a rear cross plate 81 may be provided as shown in FIG. 3, disposed at the front of channel 62 and floor members 68 in parallel, facing relationship with front cross plate 42. Channel shaped spacers 82 and 82' having backs 84 and 84' of different widths and side tabs 86 may be alternatively disposed between front cross plate 42 and rear cross plate 81 outwardly adjacent channel member 44, depending on the spacing desired between the front frame member 36 and the rear frame member 38. A tab 86 is secured to front cross plate 42 by means of bolts disposed in bores 88 in tab 86 and 92 in rear cross plate 81. Channel 62 is then secured to channel structure 44 as previously described.

The frame construction of the present invention thus provides frame sections that can be used to construct vehicle frames of various lengths, or to selectively vary the length of a given vehicle frame. In the embodiment of an electric lift truck as described, the size of the battery compartment will be varied along with the vehicle frame to provide for additional power capacity for larger vehicles.

In addition, the effective moment arm of a counterweight will also be suitably varied with the change in vehicle frame size, to provide greater counterbalancing effect for larger vehicles.

The length of the wheelbase will also be varied as the rear frame member, having the rear axle mounting assembly secured thereto, is longitudinally adjusted with respect to the front member. However, if desired, the wheelbase may be varied independently of the vehicle length, or held constant as the vehicle length is varied, by selecting an appropriate series of bolt holes 75 for mounting of axle mounting assembly 76 on rear member 38.

Figure 5:
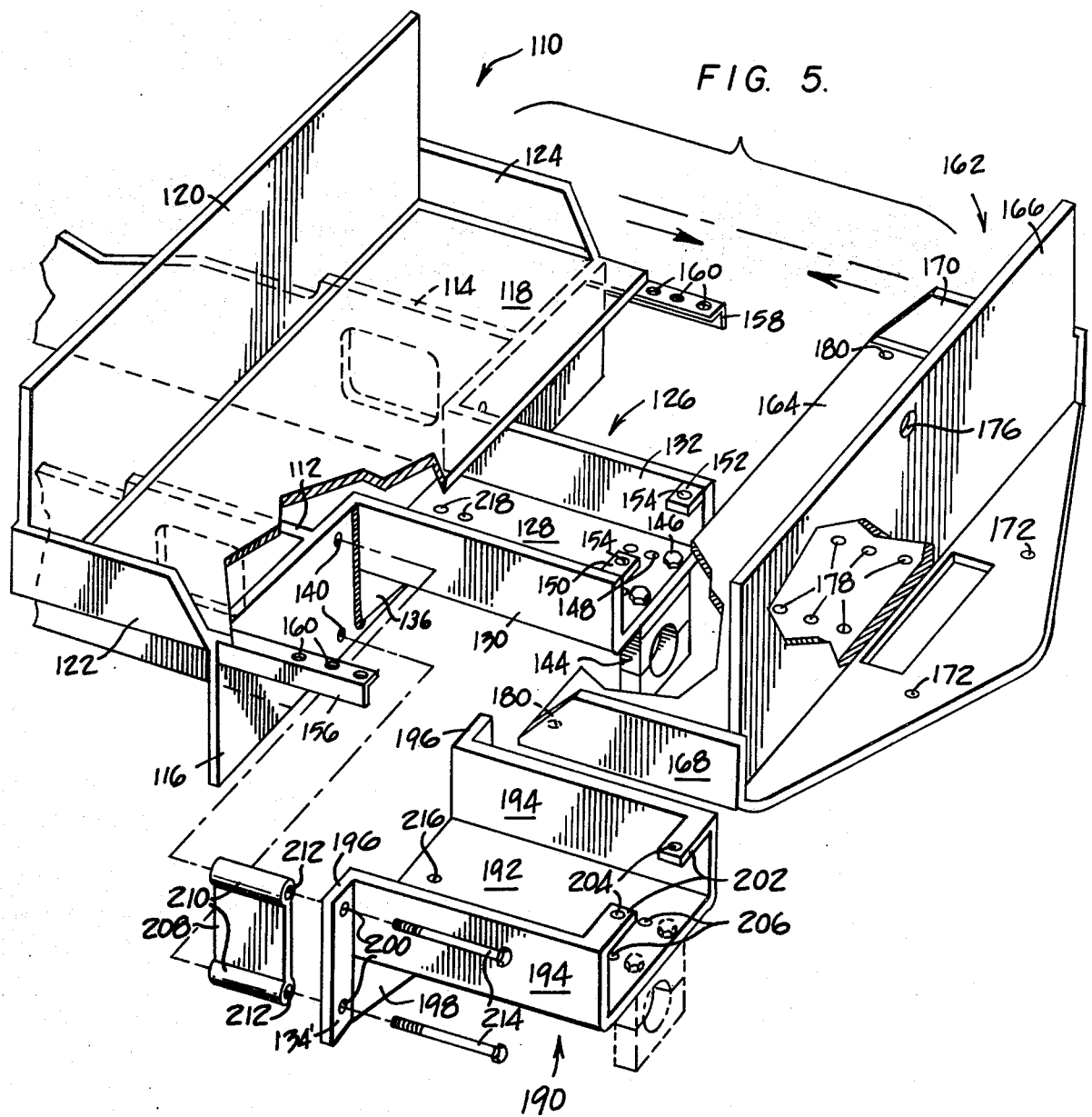
FIG. 5 is a perspective view of an alternative embodiment of the present invention.

An alternative preferred embodiment of the present invention is shown in FIG. 5. This embodiment also provides for independent increase of the length of the vehicle frame and the vehicle wheelbase, and is preferred for larger vehicles where it is desired to increase the length of the vehicle frame more, or at a greater rate than the vehicle wheelbase. In this embodiment, a front frame member 110 comprises spaced parallel rails 112 and 114 having rearward ends which terminate at and are joined by a front crossplate 116 which extends outwardly of the rails on either side of the vehicle commensurate with a front floor plate 118 disposed on the rails and crossplate. A front end wall 120 is disposed at the forward edge of the floor plate and defines the forward limit of the vehicle battery compartment. Rub rails 122 and 124 are disposed at the side edges of the front floor plate between the front end wall and the front crossplate and define the lateral extent of the front portion of the battery compartment.

Extending rearwardly of the front crossplate 116 is a channel structure 126 comprising a bottom plate 128 and upstanding side plates 130 and 132. The forward end of the channel structure 126 is welded to the front crossplate so as to be non-removable therefrom and supported in part by triangular gussets 136 also welded to the front crossplate and to the channel structure. Bores 140 are provided in front cross plate 116 outwardly adjacent channel structure 126 for purposes described hereinbelow.

Depending from the rear edge of channel structure 126 is a steer axle mount 144 which is secured to the rear edge of bottom plate 128 by means of bolts 146 disposed in selected combinations of bores 148 provided in the bottom plate. The steer axle mount 144 is adapted for mounting the rear steer axle of the lift truck thereon in the conventional manner and will not be further described.

Horizontal mounting tabs 150 and 152 are welded to the upper rear corners of side plates 130 and 132, and have bores 154 provided therein for securing a rear frame member thereto.

Angle irons 156 and 158 extend rearwardly of front crossplate 116 at the upper, outer corners thereof immediately below front floor plate 118, and have a series of bores 160 provided therein for selective attachment of a rear frame member thereto.

A rear frame member 162 comprises a rear floor plate 164 having an upstanding rear end wall 166 mounted thereon which defines the rearward extent of the vehicle battery compartment. Disposed at the side edges of the rear floor plate are rear rub rails 168 and 170 which extend between the front edge of a rear floor plate and the rear end wall 166, and are lined with front rub rails 122 and 124.

A portion of the rear floor plate 164 extends rearwardly of rear end wall 166 and is provided with bores 172 for receiving counterweight mounting bolts therein. A central bore 176 is provided in the upper central portion of the rear end wall for lifting the entire rear frame assembly for mounting on the front frame section.

A series of bores 178 is provided in the center portion of the rear floor plate 164 forward of the rear end wall and are adapted for selective alignment with bores 154 in mounting tabs 150 and 152 for securing of the rear frame section of the front frame member in a selected longitudinal relationship with the front frame member, with a portion of the plate 164 overlying a portion of the channel structure 126, the lapping portions actually being secured together. Similarly, bores 180 are provided in the forward outer corners of the rear floor plate and are adapted for alignment with selected bores 160 in angle irons 156 and 158 for further attachment of the rear frame member to the front frame section in a selected longitudinal relationship therewith.

It will be appreciated that the vehicle frame described allows for adjustment of the vehicle length, battery compartment and counter balance by varying the spacing of rear member 162 from front member 110, and registry of bores 154 and 180 with selected bores 178 and 160 respectively. In addition, the vehicle wheelbase may be varied by changing the mounting of axle mounting block 144 at bores 148 in channel structure 126. However, the extent to which such features can be varied will be limited to the combination of respective mounting bores provided.

For extended adjustment of all three features, or for construction of vehicles of a larger scale using the foregoing components, a channel extender structure 190 is provided. The channel extender 190 includes a bottom plate 192 and side plates 194 which form a channel which is congruent with and will nest under channel structure 126. Channel extender 190 includes a forward end provided with flanges 196 secured to the outer edges of side plates 194 and to triangular gussets 198 which extend below bottom plate 192. Bores 200 provided in the flanges 196 are arranged to be aligned with bores 140 in the front cross plate when the channel extender is disposed under channel member 126.

The rear end of the channel extender is provided with tabs 202 welded to the top rear corners of side plates 194 and having bores 204 provided therein.

A series of bores 206 are provided in the rear portion of bottom plate 192 for selective mounting of axle mount 144 thereon.

A spacer 208 comprising a plate including means 210 forming elongated bores 212 at the top and bottom edges thereof is disposed on each side of channel structure 126 between front cross plate 116 and flanges 196 for securing of the channel extender 190 to the front cross plate by means of bolts 214 which extend through bores 200, 212, and 140. Thus, the channel extender 190 is removable from the front cross plate 116.

Figure 6:
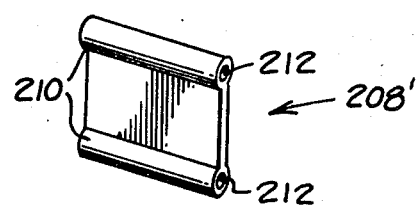
FIG. 6 is a perspective view of an alternative spacer of the present invention.

A wider spacer 208' is provided as shown in FIG. 6 for greater rearward extension of channel extender 190 with respect to front member 110. A bore 216 is provided in the front portion of bottom plate 192 and is arranged to align with one of bores 218 in the front portion of channel structure 126, depending upon which spacer is employed, for securing of the channel extender 190 to the channel 126 by means of a bolt extending through said bores.

It will then be appreciated that channel extender 190 can be added to front member 110 and adjusted to project a desired amount rearwardly therefrom for greatly increased size of a vehicle frame resulting when rear member 162 is mounted thereon, along with an increased battery compartment and wheelbase. The channel extender 190 then associates with the plate 164 in the same manner as the previously described channel structure 126.

Further, the wheelbase can also be independently adjusted by changing the location of axle mount 144 on the channel extender 190.

Accordingly, this invention provides a means of constructing vehicles of various frame sizes from a limited number of components or of varying the size, battery compartment and wheelbase of a vehicle already constructed.

The embodiments of the invention in which an exclusive property or privilege is claimed are defined as follows:

1. An adjustable vehicle frame comprising:
    a first section;
    a channel structure having a channel member secured to the first section and another channel member removably secured to the first section and in nesting relation with the secured channel member;
    a second section;
    a portion of the channel structure and a portion of the second section being in lapping relation; and
    means for selectively securing together the lapping portions of the channel structure and second section in a variety of relative positions, whereby the length of the vehicle frame may be selectively adjusted.

2. The invention of claim 1 wherein a portion of the second section overlies a portion of the channel structure.

3. The invention of claim 1 further comprising removable spacer means disposed between the first section and removable channel member.

4. The invention of claim 3 wherein the first section is a forward section and the second section is a rearward section.

5. The invention of claim 4 wherein the forward section further includes parallel rails joined by a crossplate and wherein the channel members extend rearwardly from the crossplate.

6. The invention of claim 1 further comprising spacer means of preselected width disposed between portions of said first and second sections for securing respective frame sections together at selected relative positions.

7. The invention of claim 6 wherein the spacer means comprises channel shaped spacer means adjacent to the channel structure.

8. An adjustable vehicle frame comprising:
    a first section;
    a channel structure secured to the first section wherein said first section further includes parallel rails joined by a crossplate and wherein said channel structure extends from said crossplate,
    a second section;
    a portion of the channel structure and a portion of the second section being in lapping relation; and
    means for selectively securing together the lapping portions of the channel structure and second section in a variety of relative positions, whereby the length of the vehicle frame can be selectively adjusted.

9. The invention of claim 8 wherein a portion of the channel structure overlies a portion of the second section.

10. The invention of claim 9 wherein the second section includes means forming a channel adapted to receive the channel member telescopically therein.

11. The invention of claim 10 wherein the first section is a forward section, and the second section is a rearward section.

12. An adjustable vehicle having a battery compartment comprising:
    a first section;
    a channel structure secured to the first section;
    said first section including parallel rails joined by a crossplate and wherein said channel structure extends from said crossplate and wherein said battery compartment is disposed on said rails and crossplate;
    a second section;
    a portion of the channel structure and a portion of the second section being in lapping relation; and
    means for selectively securing together the lapping portions of the channel structure and second section in a variety of relative positions, whereby the length of the vehicle frame may be selectively adjusted.

13. The invention of claim 12 wherein said battery compartment comprises a floorplate disposed on the rails and on the crossplate, and a front wall mounted on said floorplate, and rub rails provided at the sides of the floorplate.

14. The invention of claim 13 further comprising fender assemblies disposed outwardly of said rails and including side fenders which extend along sides of the first section, and wherein upper portions of the side fenders form said rub rails.

15. The invention of claim 12 wherein the first section includes rails joined by a crossplate and wherein the channel members extend from the crossplate.

16. An adjustable vehicle frame having a battery compartment comprising:
    a first section including means forming a portion of the battery compartment;
    a channel structure having a channel member secured to the first section and another channel member removably secured to the first section and in nesting relation with the secured channel member;

a second section including means forming a portion of the battery compartment;

a portion of the channel structure and a portion of the second section being in lapping relation; and means for selectively securing together the lapping portion of the channel structure and second section in a variety of relative positions to selectively adjust the length of the frame and the battery compartment.

17. An adjustable vehicle frame comprising:
a first section;
a channel structure secured to the first section;
a second section;
a portion of the channel structure and a portion of the second section being in lapping relation;
means for selectively securing together the lapping portions of the channel structure and second section in a variety of relative positions to selectively adjust the length of the vehicle frame;
an axle mount; and
means for securing the axle mount to the first section in a variety of positions.

18. An adjustable vehicle frame comprising:
a first section;
a channel structure secured to the first section;
a second section;
a portion of the channel structure and a portion of the second section being in lapping relation;
means for selectively securing together the lapping portions of the channel structure and second section in a variety of relative positions to selectively adjust the length of the vehicle frame;
an axle mount; and
means for securing the axle mount to the channel structure in a variety of positions.

19. An adjustable vehicle frame comprising:
a first section;
a channel structure secured to the first section;
a second section;
a portion of the channel and a portion of the second section being in lapping relation;
means for selectively securing together the lapping portions of the channel structure and second section in a variety of relative positions to selectively adjust the length of the vehicle frame;
an axle mount; and
means for securing the axle mount to the second section in a variety of positions.

20. An adjustable vehicle frame having a battery compartment comprising:
a first section including means forming a portion of the battery compartment;
a channel structure secured to the first section;
a second section including means forming a portion of the battery compartment;
a portion of the channel structure and a portion of the second section being in lapping relation; and
means for selectively securing together the lapping portions of the channel structure and second section in a variety of relative positions to selectively adjust the length of the vehicle frame and the battery compartment for accommodating power requirements of the vehicle.

21. The invention of claim 20 further comprising means for mounting a counter weight on one section of the frame, whereby upon adjustment of the size of the vehicle frame, the effective moment arm of the counter balance will be correspondingly adjusted to accommodate the size of the vehicle.

* * * * *